United States Patent Office 3,479,395
Patented Nov. 18, 1969

3,479,395
OXIDATION OF OLEFINS WITH TELLURIUM COMPOUNDS
Juan Luis Huguet, Corpus Christi, Tex., assignor to Celanese Corporation, a corporation of Delaware
No Drawing. Filed May 2, 1966, Ser. No. 546,618
Int. Cl. C07c *67/04, 69/16*
U.S. Cl. 260—497                                11 Claims

ABSTRACT OF THE DISCLOSURE

Olefins are oxidized to derivatives such as glycols and glycol esters by contact with tellurium dioxide solutions which are prepared by employing a halide salt to solubilize the tellurium dioxide. The oxidizing capabilities of the solution can be maintained by injecting molecular oxygen, especially in conjunction with a redox agent. Particularly effective results are obtained when the halide salt is lithium chloride and the solution comprises acetic acid.

---

This invention relates broadly to the oxidation of olefinically unsaturated hydrocarbons with tellurium oxidation catalysts.

Tellurium compounds have been known and used as catalysts in many prior art processes. For example, U.S. 2,643,269 discloses a process for the air oxidation of olefins to aldehydes by means of tellurium dioxide catalysts promoted by bromine or other halogens. Also in U.S. 2,688,041 there is disclosed a process for the oxidation of propylene to acrolein by the use of a tellurium catalyst with small amounts of vanadium oxide added. Both of these processes are vapor phase processes in which the only or predominant product obtained is an aldehyde.

Tellurium compounds such as tellurium dioxide are extremely insoluble in many solvents and for this reason processes employing tellurium dioxide in the liquid phase as a catalyst have not been successful in the past to any great extent. The extremely low solubility of tellurium and its oxide in almost every solvent is known. For example, see Journal of Organic Chemistry, volume 6, page 174. The extremely low solubility of tellurium and its oxides precludes any substantial reaction of tellurium dioxide with olefins to form organo-tellurium compounds which function as catalysts.

It is an object of this invention to provide a means of dissolving tellurium dioxide in various solvents for use as an oxidation catalyst.

It is a further object to provide a process for the continuous oxidation of olefins with tellurium dioxide in the liquid phase.

Other objects of this invention will become apparent by a reading of the disclosure.

It has been found that tellurium dioxide can be dissolved in aqueous solutions and in many organic solvents to an appreciable extent by incorporating into the organic solvent or aqueous solution a source of halide ions, usually introduced as a metal salt. The metal salt may be one having the general formula MX where M is an alkali metal or alkaline earth metal, and X is a halogen selected from the group consisting of fluorine, chlorine, bromine and iodine. Generally the source of halide ion is introduced as an alkali metal halide or alkaline earth metal halide such as the chloride, bromide, iodide or fluoride of sodium. Any other source of halide ions, and particularly chloride ions, may be used, however, including metal halides of Groups III, IV and V of the Periodic Table, and compounds such as the hydrohalic acids and quaternary ammonium halides. The amount of halide ion needed for the dissolution of tellurium dioxide varies with the solvent used and the concentration of the tellurium dioxide catalyst desired in solution. Usually a molar ratio of halide ion to tellurium dioxide ranging from 5 to 30 is sufficient. The solubility of tellurium dioxide in acetic acid is negligible at 75° C., while a 3.5 formal lithium chloride solution of acetic acid will dissolve up to a 0.19 formula weight of tellurium dioxide per liter (∼30 grams per liter). In addition it has been found that a water solution which is 7 formal in lithium chloride and 0.1 formal in hydrochloric acid will dissolve up to 0.23 mole of tellurium dioxide per liter.

The solvent in which the tellurium dioxide is dissolved may be aqueous or organic. The organic solvents useful the those in which the source of halide ion is soluble to an extent necessary to dissolve the tellurium dioxide. Alcohols, carboxylic acids, inert solvents and ethers are examples of solvents which may be used in the process according to this invention.

Tellurium dioxide, dissolved according to the above process, has been found to be an effective oxidation catalyst for olefinic unsaturated hydrocarbons. More particularly, it has been found that oxidation products of olefins can be obtained by contacting the desired olefin with tellurium dioxide in a solvent comprising a source of halide ions. Preferably a source of chloride ion is used. The solvent should be one capable of dissolving substantial quantities of the compound or compounds introduced as the source of halide ion.

The preferred tellurium compound for use in the process of the invention is tellurium dioxide, but other tellurium compounds such as tellurium oxychloride may be used.

The particular solvent used has a great effect on the oxidation products obtained. It is believed that the reaction proceeds through solvolysis of a cyclic intermediate; thus, if the reaction is carried out in organic acids, esters result; in alcohols, ethers result; and in aqueous or inert solvents such as dioxane, dialkyl formamides, or dialkylsulfoxides containing varying amounts of water, glycols result. When a reactive solvent such as water or an alcohol is used, it is believed that the solvent enters into the reaction by a mechanism as shown by the following equation:

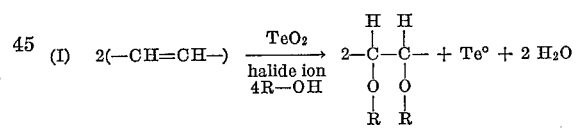

where R can be hydrogen, alkyl, aryl, aralkyl, acetyl, benzoyl, etc. Generally, water, monohydric aliphatic alcohols having from 1 to 20 carbon atoms and aliphatic carboxylic acids having from 1 to 18 carbon atoms are most useful as solvents in the instant process. Other solvents which have been found to be useful include dimethylformamide, dimethylacetamide, dimethylsulfoxide, pyridine, nitrobenzene, acetonitrile, carbitols, 1-4, dioxane, etc. The amount of solvent of this type which may be used is usually 20 to 90 weight percent of the total volume of the reaction mixture.

Olefins which are useful in the process according to this invention include those having the general formula

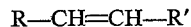

where R and R' may be hydrogen or alkyl, aryl, aralkyl, alkaryl radicals having from 1 to 20 carbon atoms. Examples of olefins which may be used include ethylene, propylene, 2-butene, octene, styrene, cyclohexene, and butadiene.

Tellurium dioxide, as used in this process, and as shown in the above equation is reduced to elemental tellurium under the reaction conditions previously described. In order to have a continuous process it is necessary to reoxidize the tellurium to tellurium dioxide. This may be done by the use of a suitable oxidizing agent. As an oxidizing agent molecular oxygen may be used, if desired, in admixture with an inert gas. The oxygen may be employed in the form of air or as a mixture of oxygen and the olefin to be oxidized when the olefin is in the gaseous form such as ethylene.

The reoxidation reaction may be carried out by addition of an active oxidizer, such as ozone; peroxidic compounds, especially hydrogen peroxide or sodium peroxide, potassium peroxide, potassium persulfate, ammonium persulfate, alkali percarbonate, alkali perborate, peracetic acid, diacetyl peroxide, benzoyl peroxide, toluyl peroxide, oxygen compounds of nitrogen, such as nitrogen dioxide and nitrogen pentoxide or mixtures of oxygen oxides containing the same, nitryl halides such as nitryl chloride, free halogen such as chlorine, bromine, halogen-oxygen compounds such as chlorine dioxide, hypochloric acid, perchloric acid, bromic acid, iodic acid, periodic acid, etc. The addition of an active oxidizer facilitates the reformation of the higher oxidation stage of the active catalyst components necessary for carrying out the reaction.

The use of an oxygen carrier or redox system may be used to facilitate reoxidation of elemental tellurium. The use of a redox system is advantageous in that the reaction rate can usually be increased and the reaction temperature lowered. As redox systems that may be used, for example, those that contain compounds of metals which under the reaction conditions employed appear in various oxidation states, for example, compounds of copper, mercury, cerium, thallium, tin, lead, titanium, vanadium, palladium, chromium, molybdenum, uranium, manganese, iron cobalt, nickel, etc. Preferably a redox system such as cupric chloride is employed.

When using molecular oxygen as the sole oxidizing agent, it has been found that elemental tellurium can be reoxidized to tellurium dioxide at atmospheric pressure and temperatures ranging from 70 to 150° C. and preferably from 90 to 100° C.

The process of this invention is carried out in solution and in the liquid phase. The present process may be carried out at room temperature or elevated temperatures. The temperature at which the rate of reaction is at an optimum will depend upon the olefin used, the pressure employed and the solvent medium. It has been noted that the reaction rate is much lower in aqueous solutions than in solutions containing, for example, acetic acid at a temperature of about 75° C. Generally, temperatures ranging from 70 to 150° C. may be used, and preferably temperatures ranging from 90 to 100° C. The process may be carried out over a wide range of pressures, e.g. pressures ranging from 0 to 1000 p.s.i.g. Increasing pressure has the effect of increasing the solubility of the olefin used in many cases and thus increasing the reaction rate.

Tellurium dioxide must be present in an amount necessary to catalyze the reaction. Greater amounts may be used, however. In the range of concentrations permitted by the tellurium solubility the reaction rate is approximately proportional to the tellurium concentration. Generally amounts of tellurium dioxide ranging from 0.1 to 3 percent by weight based on solvent may be used and preferably amounts ranging from 1 to 3 percent by weight based on solvent. The molar ratio of halide ion to tellurium dioxide should be that sufficient to dissolve an amount of tellurium compound necessary to catalyze the reaction. The amount will vary depending on the reactants and the reaction conditions employed. Generally a molar ratio of 5 to 30 and preferably from 15 to 20 is used. When lithium chloride is used as the halide source, as is preferred, a molar ratio of lithium chloride to tellurium dioxide ranging from 15 to 20 is beneficial.

The oxidation products obtained by the process according to this invention are dependent to a great extent upon the solvent medium used as explained previously. When a reactive solvent, such as acetic acid, is used, mono- and di-acetates of the particular glycols are obtained. When an alcohol is used as the solvent, ethers are obtained. The mechanism of the reaction is not exactly known but the nature of the products obtained and the discovery that cis-butene reacts much faster than the corresponding trans-butene indicates that the reaction may proceed through a cyclic intermediate as shown below:

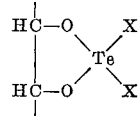

where X represents a halide ion.

The following examples are intended to be illustrative and are not to be considered limiting in any respect.

EXAMPLE I

A lithium chloride solution was prepared by dissolving 15 g. of lithium chloride in 100 ml. of glacial acetic acid at 60° C. After the lithium chloride was dissolved completely, 3 g. of tellurium dioxide was added and the temperature maintained at 60° C. for 30 minutes with vigorous stirring. The solution was clear and had an intense yellow-green color.

EXAMPLE II 2-butene was fed into a reaction containing the solution prepared in Example I at atmospheric pressure and 75° C. A rapid precipitation of black elemental tellurium occurred. The precipitate dissolved when the olefin was replaced by oxygen. The products of the reaction were trapped and identified and shown to be the di- and mono-acetates of 2,3-butane diol.

EXAMPLE III

Gray elemental tellurium (0.3 g.) was introduced together with 30 cc. of a 15% lithium chloride in acetic acid solution into a small glass reactor which was magnetically stirred. The temperature was maintained at 90 to 95° C. and oxygen circulated through the reactor. After one hour the tellurium went completely into solution.

EXAMPLE IV

A solution was prepared containing 1% tellurium dioxide in an acetic acid solution containing 15 g. percent of lithium chloride. Tellurium dioxide was completely soluble at 75° C. Seventy-five cc. of this solution was charged to a glass reactor and the glass reactor introduced into a 320 cc. stainless steel bomb, charged with 5 g. of 2-butene, and pressurized with oxygen to a pressure of 260 p.s.i.g. at 25° C. The reaction solution was heated to a temperature of about 130° C. for about 6 hours. The reaction was discontinued and the products analyzed. The diacetate of 2,3-butene diol was obtained in a concentration of about 6.5%. Elemental tellurium was precipitated during the reaction.

EXAMPLE V

One gram of tellurium dioxide was dissolved in a 30 cc. of a 15% lithium chloride-acetic acid solution at 75° C. A clear green-yellow solution was obtained. Thirty cc. of this solution was heated to 95° C. and 2-butene was fed to a reactor containing this solution at 760 mm. Hg absolute. After 20 minutes the solution turned dark and some elemental tellurium was observed. The system was charged with oxygen and after 30 to 40 minutes the solution regained its original appearance (yellow-green). A mixture of 30% 2-butene, 70% oxygen, fed through the reaction mixture, kept the solution in the yellow-green state without precipitation of elemental tellurium. The oxidation product observed was the mono-acetate of 2,3-butene diol.

EXAMPLE VI

A solution containing 18 g. of lithium acetate and 100 cc. of acetic acid was heated to 100° C. and 1 g. of tellurium dioxide added to the solution. The solution remained milky indicating that tellurium dioxide was soluble in a proportion of less than 1.0%. Two-butene was fed into a reactor containing the above solution. No reaction was observed after four hours.

EXAMPLE VII

A reactor solution containing 180 cc. of a 15% lithium chloride solution in acetic acid and 5.0 g. of tellurium dioxide was heated to 85° C. and 2-butene fed into the solution. The initial 2-butene fed into the reactor contained about 55% of the trans isomer and 45% of the cis isomer. After about 2 hours reaction time the butene mixture contained about 98% trans isomer and 2% of the cis isomer indicating that the cis isomer reacted about 10 times faster than the trans isomer and suggested that the reaction proceeded through a cyclic intermediate.

EXAMPLE VIII

A reactor solution of 200 cc. acetic acid containing 15% lithium chloride and 2% tellurium dioxide was charged with 5.0 g. of 1-octene and the mixture heated at 90 to 95° C. for 1 hour. Practically all of the tellurium dioxide was reduced to elemental tellurium. The acetic acid was flashed off at 70° C. and 60 mm. Hg absolute. The residue was washed with water several times and then extracted with ether. A dark colored ether solution was obtained simultaneously with a black solid (elemental tellurium). Analysis of the extract showed that the predominant products were mono- and diacetates of 1,2-octane diol. Other products were identified as acetoxy chlorooctanes.

EXAMPLE IX

Into 200 cc. of water containing 30 g. of lithium chloride and 0.5 cc. of 30% hydrochloric acid was introduced 2 grams of tellurium dioxide. The tellurium went completely into solution. One hundred cc. of this solution was placed in a glass reactor which was charged into a 320 cc. stainless steel bomb. Seven grams of 2-octene were charged through the reactor along with oxygen pressured at 200 p.s.i.g. at 27° C. The solution was heated for 6 hours. The reaction products were removed and analyzed. A mixture of chlorinated ketones and a chlorinated alcohol were obtained in a low yield.

EXAMPLE X

Into 200 cc. of benzene 3 grams of ferric chloride were dissolved. One gram of tellurium dioxide was added. Part of the tellurium dioxide remained insoluble. The solution was heated to 70° C. at which time the remainder of the tellurium dioxide dissolved.

The embodiments of the invention in which an exclusive property of privilege is claimed are defined as follows.

I claim:
1. A method for oxidizing a lower alkene to form a product which is one of the group consisting of glycols and glycol acetates in which the glycol moiety is derived from said alkene, which method comprises oxidizing said alkene in the presence of molecular oxygen in a solution comprising tellurium dioxide, an alkali metal halide and a redox agent dissolved in a solvent which is a member of the group consisting of water, acetic acid, and mixtures of water with about 20 to 90 weight percent of a member of the group consisting of dioxane, dialkyl formamides, and dialkyl sulfoxides, at a temperature ranging between 70° C. and 150° C. and at a pressure between about 0 p.s.i.g. and 1000 p.s.i.g.

2. Method according to claim 1 wherein the redox agent is cupric chloride and the halide is a chloride.

3. Method according to claim 1 wherein the molar ratio of halide ion to tellurium dioxide ranges from 5 to 30 and the halide is a chloride.

4. The method according to claim 3 wherein the halide is lithium chloride.

5. The method according to claim 3 wherein the product comprises a glycol acetate and the solvent comprises acetic acid.

6. The method according to claim 3 wherein the product comprises a glycol and the solvent comprises a member of the group consisting of water and mixtures of water with about 20 to 90 weight percent of a member of the group consisting of dioxane, dialkyl formamides, and dialkyl sulfoxides.

7. The method according to claim 6 wherein the solvent consists essentially of water.

8. A method for oxidizing a lower alkene to produce an acetate ester of a glycol corresponding to said alkene, which method comprises contacting said alkene with a solution comprising tellurium dioxide and an alkali metal halide salt dissolved in acetic acid, at a temperature ranging from 70° C. to 150° C. and at a pressure ranging from 0 p.s.i.g. to 1000 p.s.i.g.

9. Method according to claim 8 wherein the molar ratio of halide ion to tellurium dioxide ranges from about 5 to 30 and the halide is a chloride.

10. Method according to claim 9 wherein the halide salt is lithium chloride.

11. Method according to claim 9 carried out in the presence of molecular oxygen.

References Cited

UNITED STATES PATENTS

| 2,223,500 | 12/1940 | Scott et al. | 260—631 |
|---|---|---|---|
| 2,428,590 | 10/1947 | Shokal et al. | 252—439 |
| 2,530,923 | 11/1950 | Turk et al. | 252—439 |
| 2,643,269 | 6/1953 | Augustine | 252—439 |
| 2,648,638 | 8/1953 | Richter | 23—139 |
| 2,688,041 | 8/1954 | Middleton | 252—439 |
| 2,833,787 | 5/1958 | Carlson et al. | |
| 3,007,944 | 11/1961 | Amir. | |
| 3,048,636 | 8/1962 | Grinstead. | |
| 3,140,303 | 7/1964 | De LaMare et al. | |
| 3,159,688 | 12/1964 | Jennings et al. | 252—439 |
| 3,240,806 | 3/1966 | Bethell et al. | 252—439 |
| 3,262,969 | 7/1966 | Clark et al. | 260—476 |
| 3,274,238 | 9/1966 | Kojer et al. | 260—476 |
| 3,278,590 | 10/1966 | Clark et al. | 260—476 |

OTHER REFERENCES

Mallinckrodt Catalog (1960), p. 110.

BERNARD HELFIN, Primary Examiner

J. E. EVANS, Assistant Examiner

U.S. Cl. X.R.

23—139; 252—439; 260—429, 476, 611, 613, 615, 618, 631, 635